United States Patent

Blanchfield et al.

[15] 3,639,223
[45] Feb. 1, 1972

[54] CHLORATE CELL

[72] Inventors: Richard J. Blanchfield, Chateauguay, Quebec; John F. Smith, Montreal, Quebec, both of Canada

[73] Assignee: Standard Chemical Limited, Montreal, Quebec, Canada

[22] Filed: Sept. 18, 1970

[21] Appl. No.: 73,308

[52] U.S. Cl. .............................. 204/95, 204/270, 204/278
[51] Int. Cl. ................................... C01b 11/26, B01k 1/00
[58] Field of Search ................... 204/95, 267, 270, 275–278

[56] References Cited

UNITED STATES PATENTS

| 716,789 | 12/1902 | Threlfall | 204/95 X |
| 3,324,023 | 6/1967 | Kircher | 204/270 X |
| 3,539,486 | 11/1970 | Fleck | 204/95 |

Primary Examiner—F. C. Edmundson
Attorney—Chisholm and Spencer

[57] ABSTRACT

An improvement in the operation of chlorate cells is described in which the product liquor flow from one or a plurality of electrolytic alkali metal chlorate cells is fed to a collection zone provided with a baffling arrangement such that hydrogen gas disengaging from the cell liquor does so under a liquid seal that separates it from the gases in the cell liquor outlet. The liquid seal for disengaging hydrogen from the liquor insures that there is no direct communication between the gases being disengaged and the gases in the interior of the cells and in the cell liquor outlet lines. The described improvement prevents any explosion or fires which may occur in hydrogen vents and/or collection equipment from reaching the interior of the alkali metal chlorate cells. Thus, fires which may occur in hydrogen gas lines as the result of sparks, lightning and other similar phenomena are prevented from reaching the interior of the cells.

3 Claims, 3 Drawing Figures

INVENTORS
RICHARD J. BLANCHFIELD
JOHN F. SMITH

BY Chisholm and Spencer

ATTORNEYS

CHLORATE CELL

BACKGROUND OF THE INVENTION

The present invention relates to the operation of alkali metal chlorate cells. In particular the present invention relates to the operation of alkali metal chlorate cell systems in which large quantities of electrolyte containing trapped hydrogen gas are treated to separate the trapped hydrogen gas from the electrolyte.

In the operation of alkali metal chlorate cells, for example, the cells described in U.S. Pat. No. 3,203,882 and in U.S. Pat. No. 3,463,722, it is conventional to remove electrolyte and trapped gases from the cell and at least partially degasify them in the effluent conduits. This separation of gas from electrolyte is accomplished by providing risers in the effluent conduits for electrolyte or cell liquor emanating from the cells so that hydrogen disengaged in these conduits during transit therethrough can be removed readily in these risers for collection elsewhere or for discharge from the building housing the cells.

Thus, in U.S. Pat. No. 3,203,882 the product containing electrolyte or liquor and the trapped hydrogen gas bubbles are removed via conduit 19 of FIG. 2 of said patent and flow along the side of the cell box to a suitable recovery unit. Along the flowing tube or conduit through which the electrolyte and trapped gases are flowing, several risers (not shown in the patent) are typically provided for the removal of hydrogen gas. In U.S. Pat. No. 3,463,722 a T-separator 15 is provided (note FIG. 2 of the patent) and the effluent liquor passes to this separator via line 17 into a reactor or holding tank. The hydrogen gas leaves the T-separator 15 through line 16 in this patent.

As will be readily understood, such hydrogen outlets in an electrolytic cell or associated liquor outlets, while useful in removing hydrogen from cell liquor in outlet lines, are in direct communication with the gaseous hydrogen collecting and being removed from the cells themselves through the cell liq. or outlets. This is a potentially dangerous situation since it is normally found in the operation of such cells that the effluent conduits containing the cell electrolyte or liquors and trapped hydrogen gas contain considerable quantities of foam therein. This foam which is constituted of cell liquor and large quantities of trapped hydrogen gas bubbles occupies considerable space in these electrolyte or cell liquor discharge conduits. For these reasons any explosion or fire occurring in an hydrogen riser or hydrogen outlet provides a definite hazard to the interior of the cells which are associated with such outlets through this space in the cell liquor discharge conduits.

THE PRESENT INVENTION

In accordance with the present invention, a method of removing hydrogen gas from alkali metal chlorate cells safely and efficiently is provided. Little or no danger to the interior of the cells from which hydrogen is removed in the event of fire or an explosion in a hydrogen gas outlet is encountered using the instant invention.

In the method of the instant invention hydrogen gas is removed from an alkali metal chlorate cell or a plurality of such cells in suspension in the cell liquor or electrolyte. The liquor and hydrogen are introduced typically into a vessel or conduit so constructed and arranged that there is provided therein a liquid seal to maintain that portion of the vessel or conduit in direct communication with the interior of the cell or cells through the cell liquor discharge lines separated by the liquid seal from a further portion of the vessel or conduit wherein gaseous hydrogen is separated and removed from the cell liquor.

In the preferred embodiment of the instant invention this is accomplished by providing a vessel with a baffle plate sealed against the vessel wall and the top. The lower edge of the baffle plate is positioned in the vessel so that it is raised above the floor of the vessel thereby providing communication between the two sections of the vessel formed by the positioning of the baffle plate. The vessel communicates with the cell liquor or electrolyte discharge line from the electrolytic cell or cell line. Thus, liquid entering the vessel from the cell liquor discharge lines is divided into at least two pools in the upper portion of the vessel while a single pool is provided in the lower portion of the vessel. Liquor from the alkali metal chlorate cell or cells having the hydrogen substantially removed therefrom is discharged from the vessel on a side of the vessel separated from the entrance point for electrolyte by the baffle plate. A hydrogen outlet is provided on a side of the baffle plate opposite the side on which the cell liquor from the cell or cells is being fed to the vessel.

In the operation of alkali metal chlorate cells in accordance with the preferred embodiment of the instant invention, electrolyte or cell liquor containing hydrogen enters the vessel with the trapped gas and flows under the baffle plate to the other side of the vessel. The electrolyte itself flows out of an outlet pipe provided on the vessel wall behind the baffle plate while hydrogen gas is disengaged therefrom and flows out of the vessel through a suitable outlet, preferably provided in the cover. The net effect of an operation of this character is that a liquid seal is provided and maintained in between cell liquor discharge lines from the electrolytic cell or cells and the conduits in which cell electrolyte or liquor and hydrogen from these cells is flowing. It also separates cell electrolyte from hydrogen gas being removed from the cell system in the vessel. Thus, any fires or explosions occurring in the hydrogen outlet portion of the total electrolytic cell system cannot be effectively transmitted to the interior of the electrolytic cells themselves since all of the gases present in the cells and cell outlets are effectively separated from the hydrogen gas outlet system by a liquid seal provided by a head of cell liquor or electrolyte.

For a more complete understanding of the invention reference is made to the accompanying drawings in which:

FIG. 1 represents a plan view of a series of electrolytic cells of the bipolar type such as described in U.S. Pat. No. 3,203,882 using the method of the instant invention to separate hydrogen from electrolyte;

Figure 1:
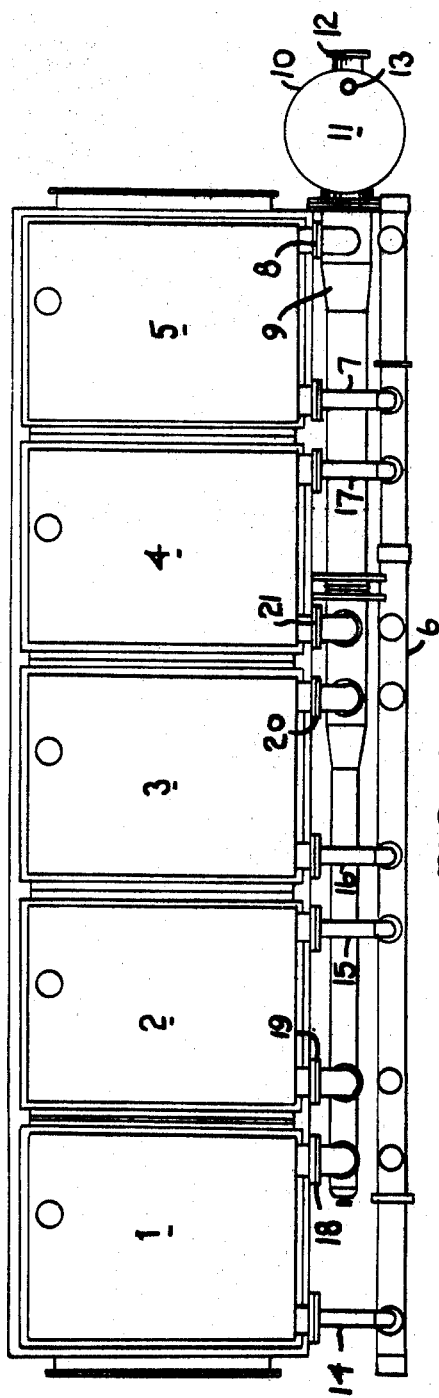
Figure 2:
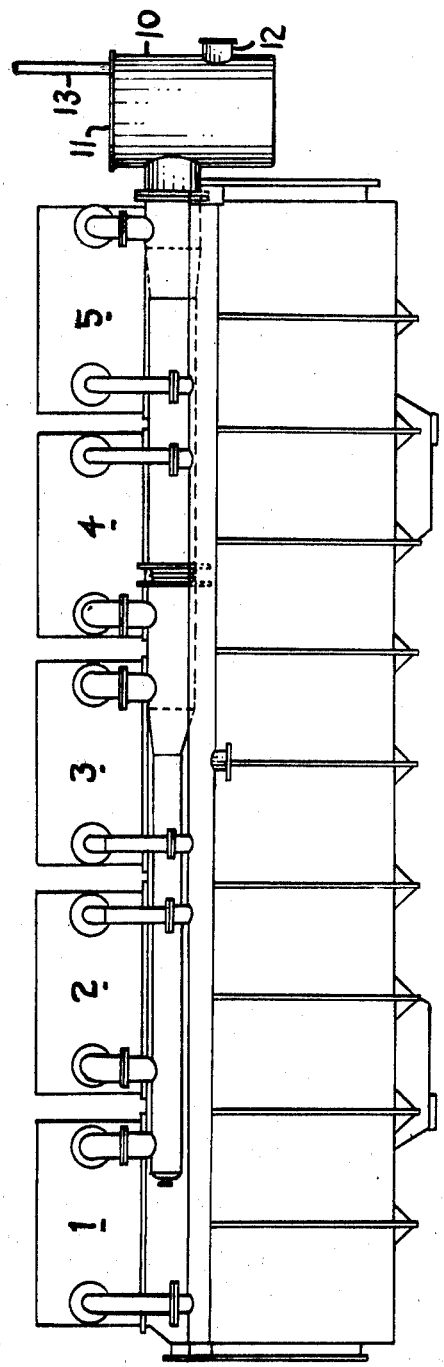
FIG. 2 represents a side view of the electrolytic cells of FIG. 1.
Figure 3:
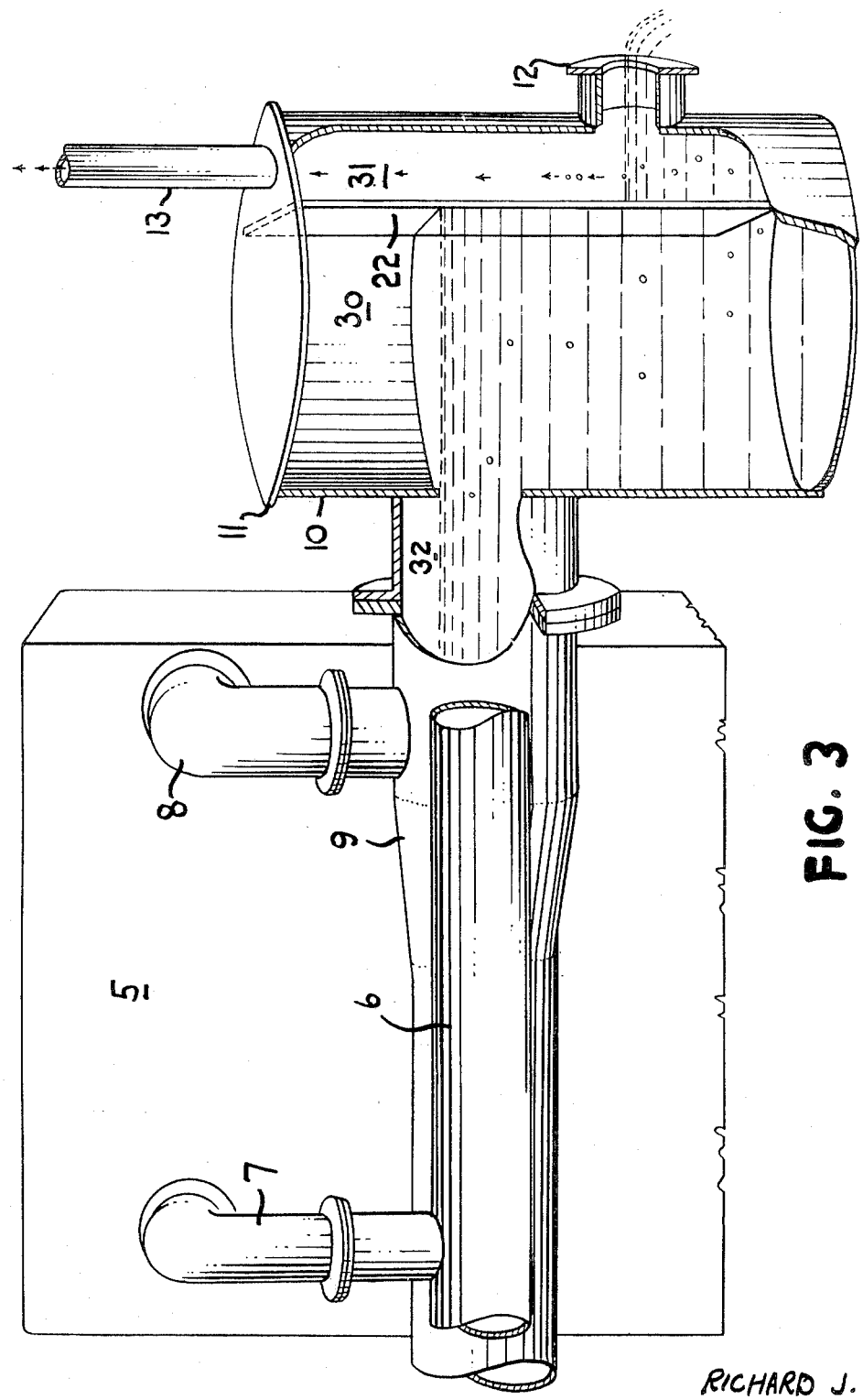
FIG. 3 represents an enlarged view of the vessel 10 shown in FIGS. 1 and 2 with the sides partially broken away to show the interior of the vessel, the gas and liquid inlets and outlets and a baffle arrangement.

Turning to the drawings, and in particular, to FIGS. 1 and 2, there is shown a series of electrolytic cells 1, 2, 3, 4 and 5. For the purpose of this discussion the invention will be discussed with particular reference to cell 5 in the series shown in FIGS. 1 and 2. As can be readily seen an inlet header 6 is provided for the cell series shown in these figures. From this inlet header 6 a brine feed line 7 is shown entering cell 5. Electrolyte or cell liquor and trapped hydrogen gas are removed from cell 5 through outlet line 8 and are introduced into a common discharge line 9. Discharge line 9 empties into a vessel 10 which is provided with an interior baffle 22 (FIG. 3) and an outlet line 12 for the removal of electrolyte therefrom. The cover 11 of the vessel 10 is provided with a gas outlet line 13.

The cells 1, 2, 3 and 4 are fed from brine inlet 6 via lines 14, 15, 16 and 17, respectively. In similar fashion discharge lines 18, 19, 20 and 21 are utilized to discharge fluid or electrolyte from the cells 1, 2, 3 and 4, respectively. Thus, as can be readily seen from an examination of FIG. 1, electrolyte and gases associated therewith leave the cells 1, 2, 3, 4 and 5 through lines 18, 19, 20, 21 and 8 enter the discharge line 9. Line 9 is provided with dimensions that insure a progressively expanding diameter. By regulating the diameter of the discharge conduit, considerable reduction in the quantity of foam and gas that can collect in the cells can be realized. Thus, by providing in line 9 an increasing diameter, adequate space for the discharge of cell foam is provided. Line 9 therefor is at its smallest diameter as it collects electrolyte from cells 1 and 2 and expands in diameter as it collects electrolyte from cells 3 and 4. The diameter of line 9 expands again as it receives electrolyte from cell 5 via line 8. All of the electrolyte or cell liquor collected from cells 1, 2, 3, 4 and 5 comingle in conduit 9 and is passed from this conduit into the vessel 10.

The electrolyte or cell liquor flowing from cells 1, 2, 3, 4 and 5 enters vessel 10 through line 9 and substantially fills this vessel 10 to the height of the discharge line 9 thereby forcing cell liquor through the liquid head created down below the baffle plate 22 and out the outlet 12 provided on the wall of the vessel 10 on the other side of the baffle plate 22. The baffle plate 22 is situated such that it is sealed to the coverplate 11 thereby preventing gas communication between the two compartments 30 and 31. While these compartments communicate with each other under the bottom edge of the baffle 22, they are substantially separated and sealed off from each other at the cover 11.

With this arrangement it will be readily appreciated that any tendency for hydrogen gas to accumulate in the spaces 30, 31 and 32 when electrolyte foaming occurs in conduit 9 or when hydrogen separates from cell liquor in chamber 30 and provides pockets of accumulated hydrogen gas is not a particularly dangerous situation. Should something dramatic occur, such as a fire in the outlet 13, liquid electrolyte is effectively utilized as a seal between the gas space 31 and the gas spaces 30 and 32 located in the upper portion of the vessel 10 and in conduit 9, respectively. As long as the electrolyte flow into the vessel 10 is maintained in outlet line 9 at a sufficient rate to provide for an electrolyte level or head in the vessel 10 and so long as this head is maintained above the lower edge of the baffle member 31, no substantial degree of damage to the interior of the cells 1, 2, 3, 4 and 5 by deleterious reactions such as fires or explosions occurring in the vapor space 31 of the vessel 10 or in outlet 13 exists.

It is preferred in the practice of this invention that a liquid level be maintained above the baffle plate so that a head of liquid of at least 12 inches in height above the lower edge of the baffle is provided. A liquid head greater than this or even less than this can be maintained so long as a liquid seal is maintained between spaces 30 and 31 of vessel 10 and the cell protection provided by the instant invention will be realized.

In the particular embodiment shown in the accompanying drawing the liquid seal has been provided by a baffle plate 22 sealed to the cover and sides of the vessel 10 and spaced above the bottom thereof. Obviously modifications of this particular arrangement can be made without departing from the spirit of the invention. Thus, two vessels communicating with each other through a conduit located in the bottom of the first vessel and connected to the bottom of the second may be employed. In such an embodiment the liquid seal is provided by feeding electrolyte or cell liquor into one vessel and providing an electrolyte withdrawal means and a separate gas outlet in the second vessel. In this manner a liquid seal is provided which effectively protects the cells or cell connected to the feedline from explosion or fires which may occur in the gas outlet. Similarly while a flat baffle plate adhering to the sidewalls of the vessel 10 and the cover 11 of the vessel 10 is shown dividing vessel 10 into sections 30 and 31 and providing the liquid seal between the two sections, it is obvious that other shapes and contours of baffles can be utilized without departing from the spirit of the invention. Still further, while a single baffle plate has been employed in the foregoing description, it will be obvious that a plurality of baffles can be provided between the inlet 9 and the outlet 12 to provide a plurality of seals and gas outlets across the vessel 10.

These and other modifications employing the liquid seal of the instant invention will become obvious to those skilled in the art in view of the foregoing description of the invention.

Therefore, while the invention has been described with reference to certain specific examples and illustrative embodiments, it is not intended that it be so limited except insofar as appears in the accompanying claims.

We claim:
1. A method of at least partially separating hydrogen gas from cell liquor recovered from an alkali metal chlorate cell comprising feeding the hydrogen containing cell liquor to a first zone, passing the liquor to a second zone, removing liquor from said second zone at one point therein and removing hydrogen from the upper portion of said second zone while maintaining between the gas outlet in said second zone and the liquor in the first zone a body of liquor to thereby prevent any gas communication between the first and second zones.

2. A method of removing cell liquor containing chlorate and hydrogen from electrolytic alkali metal chlorate cell comprising introducing the cell liquor into a first zone, passing the liquor to a second zone separated from the first zone by a liquid body, and removing hydrogen from the liquor in said second zone.

3. In the removal of cell liquor containing hydrogen from an alkali metal chlorate cell the improvement comprising feeding the cell liquor to a vessel provided with a partition separating the vessel into at least two sections which are in communication with each other across the bottom of the vessel, filling said vessel with cell liquor to a point substantially above the lower edge of said partition, withdrawing cell liquor from a section of the vessel separated from the section in which the cell liquor is fed and removing hydrogen gas in a section of the vessel out of gas communication with the section in which cell liquor is being fed by providing a liquid seal between the sections of said vessel formed by said partition.

* * * * *